United States Patent [19]
Coombes et al.

[11] Patent Number: 5,153,904
[45] Date of Patent: Oct. 6, 1992

[54] RADIO COMMUNICATION CONTROLLER FOR SUBSCRIBER-REQUESTED CALLING CODE PREFACING

[75] Inventors: John J. Coombes, Palatine; Daniel J. McDonald, Hanover Park, both of Ill.

[73] Assignee: Motorola, Inc., Schaumburg, Ill.

[21] Appl. No.: 597,461

[22] Filed: Oct. 15, 1990

[51] Int. Cl.$^5$ ............................................ H04M 11/00
[52] U.S. Cl. ...................................... 379/58; 379/355
[58] Field of Search ................................. 379/58-60, 379/63, 354, 355

[56] References Cited
U.S. PATENT DOCUMENTS 4,700,374  10/1987  Bini.
4,876,738  10/1989  Selby.
4,980,910  12/1990  Oba et al. ........................... 379/354

OTHER PUBLICATIONS

Panasonic KX-T2345 Integrated Telephone System Operating Instructions, 1986, pp. 6-7—discloses a typical procedure for using handset memory to store frequently dialed numbers, which can be prefaced or appended to another number dialed by the user.

Motorola Privacy Plus 1000 Radiophone Instruction Manual No. 68P81064E20-B, Sep. 6, 1984, p. 6-discloses the use of storing frequently dialed numbers in the handset memory of a radiophone, which can be edited and later retrieved for use in making a telephone interconnect call.

The Bell System Technical Journal, vol. 61, No. 5, May–Jun. 1982, pp. 821-8389, discloses several new custom calling services offered by the Bell System, among them a feature referred to as "Speed Calling". This feature represented a change over older similar features in that users could change the stored numbers directly from their own phones, without a written service order to the telephone company.

*Primary Examiner*—James L. Dwyer
*Assistant Examiner*—Dwayne D. Bost
*Attorney, Agent, or Firm*—Joseph P. Krause; Steven G. Parmelee

[57] ABSTRACT

A radio communication controller (106, 401) is disclosed which is capable of accessing a database having a subscriber unit identification code (302, 601) and a preselected calling code, or area code, accumulating a keyed Public Switched Telephone Network (PSTN) telephone number from the subscriber unit wishing to make an interconnect call (110, 407), and comparing (215, 518) this area code with that of the controller site. The controller, as employed by the invention, is further capable of deciding whether or not the area code is required for completing the interconnect call, and if so, prefacing (217, 520) the accumulated PSTN telephone number with the area code preselected by the user of that subscriber unit.

17 Claims, 3 Drawing Sheets

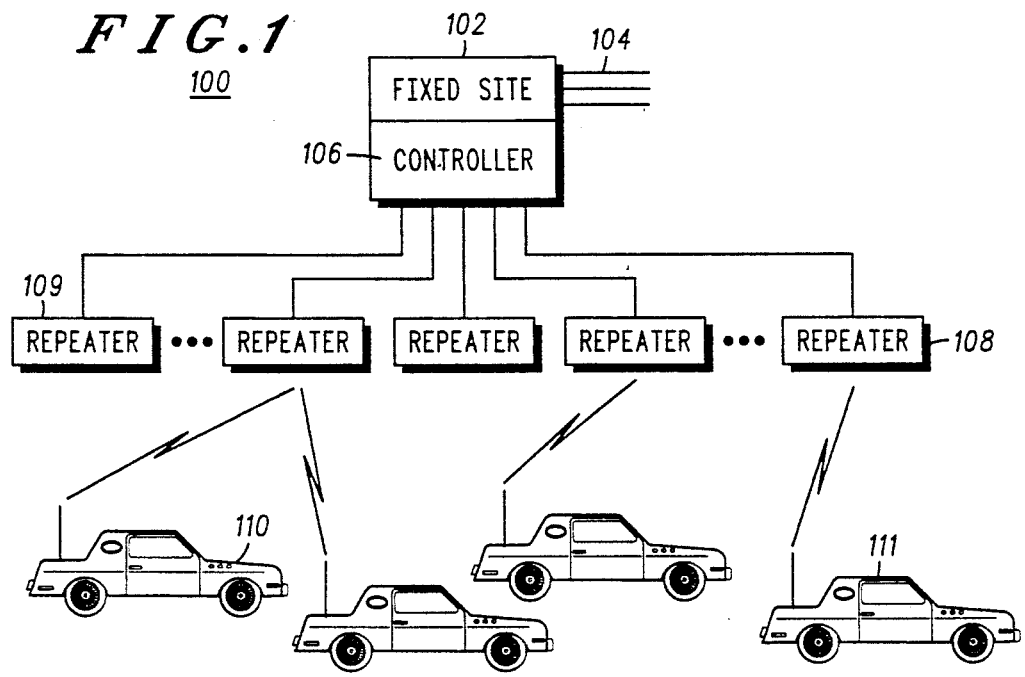
FIG.1
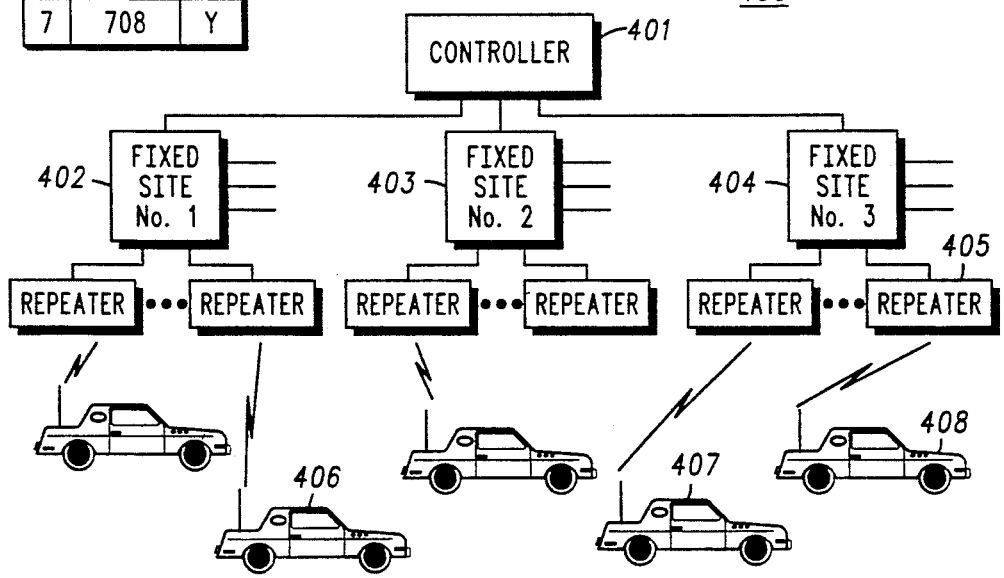
FIG.3
FIG.4

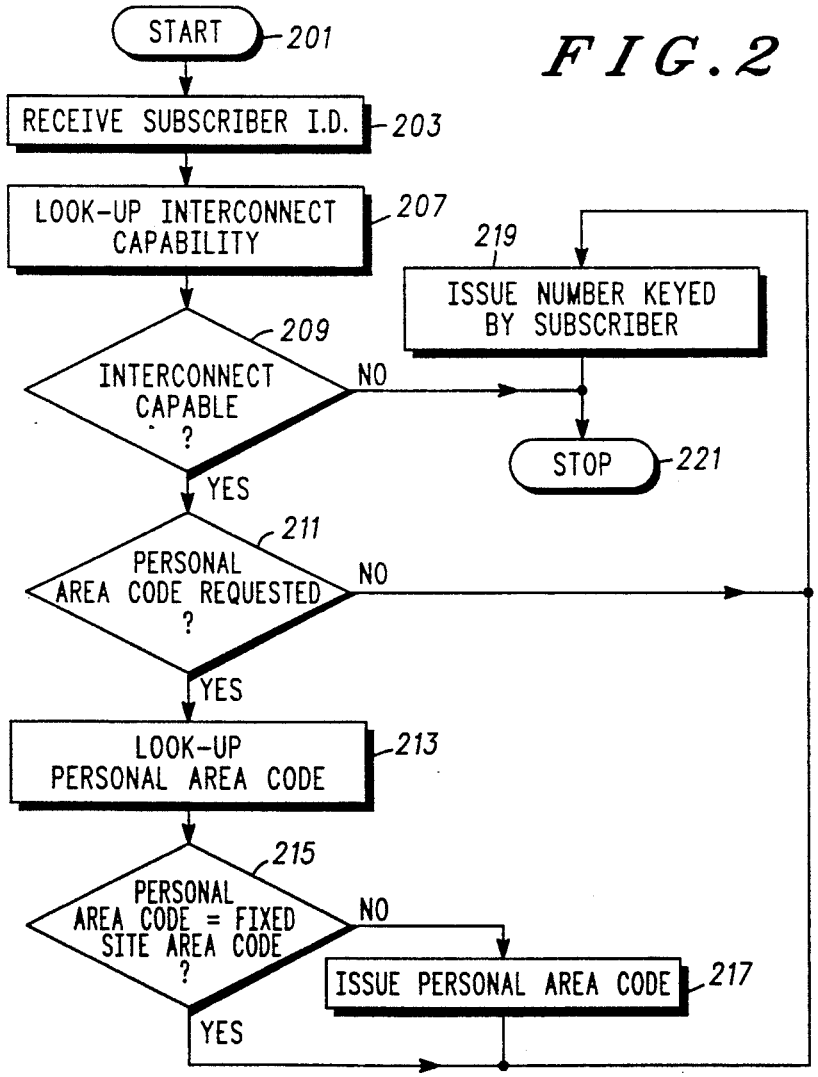

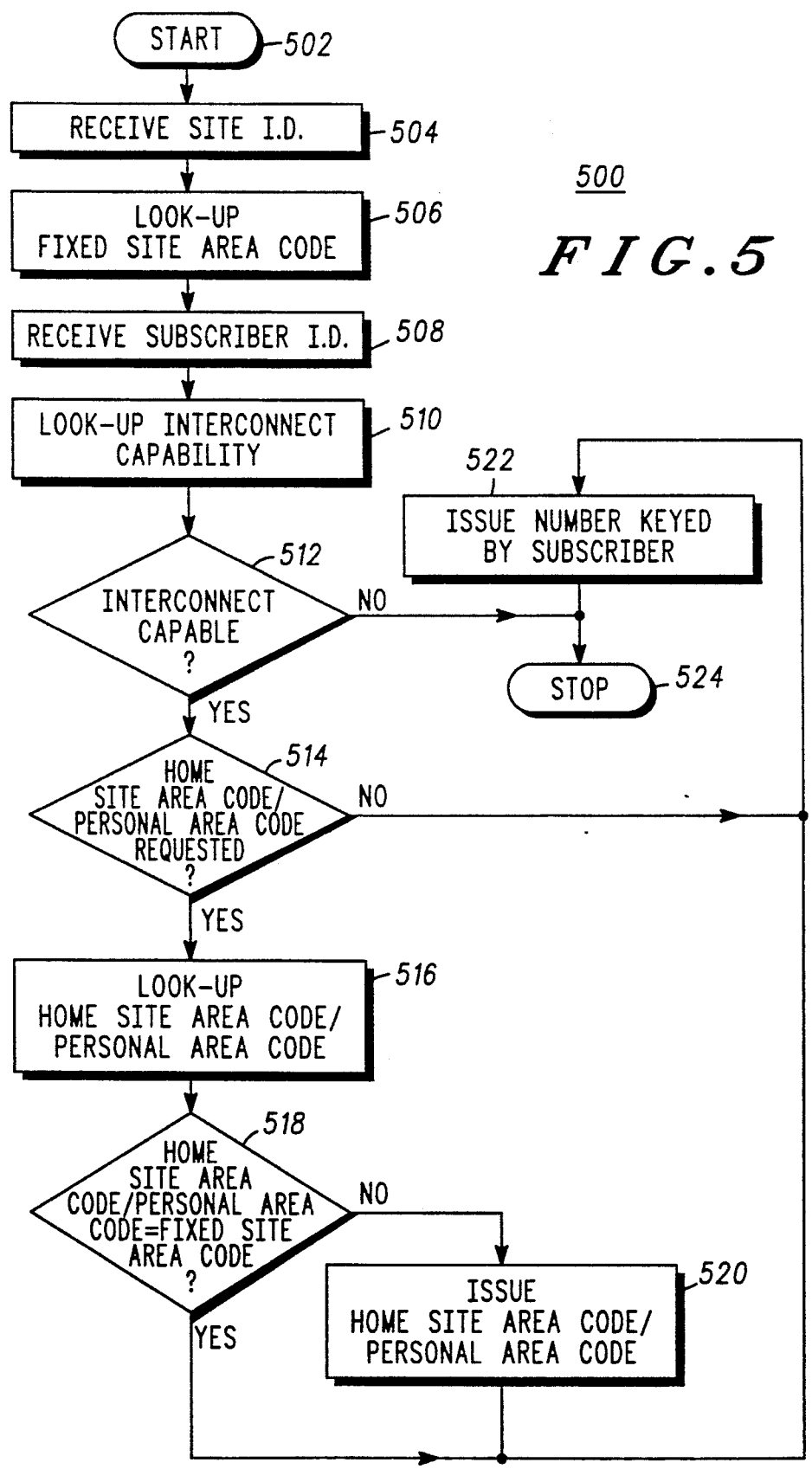

RADIO COMMUNICATION CONTROLLER FOR SUBSCRIBER-REQUESTED CALLING CODE PREFACING

FIELD OF THE INVENTION

The invention relates generally to fixed site controllers located within trunked radio communication systems, and particularly to the prefacing of a predetermined calling code in response to a request from one or more roaming subscriber units within such a system.

BACKGROUND OF THE INVENTION

Trunked radio systems, acting as stand-alone systems or as part of a wide geographic area coverage system, and having telephone interconnect capabilities assigned to specific radios within that radio system, are known. In the stand-alone configuration, subscribers may wish to dial land-line individuals who may be geographically located outside of the calling area, as defined by the calling code, or area code, associated with the Public Switched Telephone Network (PSTN) phone lines at the fixed site upon which the mobile is active. Currently, doing so requires the keyed entry of three or more characters, in addition to the PSTN telephone number of the land-line unit, in order to successfully complete the interconnect call.

For wide area systems with a multitude of fixed sites, each fixed site having a set of PSTN phone lines which are associated with a calling code. Some of these codes are common among different sites, while others are unique to that site. Users of subscriber units within the system will be assigned to a specific primary, or home, site and will more than likely be making interconnect calls within that primary site's area code. This radio user, however, has the ability to roam into another site's boundaries within the trunked radio system. Once the radio has moved into a new site away from its home site, the user may be required to enter the area code of the radio's home site if the user wishes to make a telephone interconnect call to a land-line within the area code boundaries of the radio's home site. This becomes a requirement when the site upon which the radio is active has a different area code than the land-line in its home site. Additionally, a radio user roaming between sites would normally be required to dial the area code of the radio's home site, if outside the boundaries of that site's area code. This radio user may roam from these boundaries quite often, but desire to make many calls to individuals located within the area code of the home site. In the case where a subscriber unit is continually roaming along area code boundaries, there may be a requirement to preface the area code of a desired land-line number for every call initiated by that subscriber unit.

There are two problems associated with the aforementioned scenario. The first, and perhaps most obvious, is the inconvenience associated with having to dial the area codes necessary for a given land-line interconnect call, in addition to the required seven digit number for that land-line. This condition, is merely a nuisance to the initiating party. The second problem goes beyond that, though. If either the area code is prefaced by the user to the seven digit number when it is not required to do so, or the area code is ignored by the user when its presence is required, the call initiation attempt will fail. This failure results in, at best, a requirement to reinitiate the call. In an emergency situation, of course, the consequences of the aforementioned scenario are more severe.

Accordingly, the need exists for a trunked communication system to have the capability of both determining whether or not a calling, or area code is required, and then if there is such a requirement, generating a number by prefacing the appropriate area code to the telephone number keyed by the user of the roaming subscriber unit.

SUMMARY OF THE INVENTION

The present invention encompasses a radio communication controller coupled to the Public Switched Telephone Network (PSTN) and associated with a PSTN calling code, or area code, capable of accessing a database having an identification code associated with a subscriber unit and another area code, accumulating a PSTN telephone number from the subscriber unit, and receiving a request from the subscriber unit. The controller is further capable of matching the identification of the requesting subscriber unit to a stored identification code and its associated calling code in the database, and comparing this area code with that of the controller site. The controller, as employed by the invention, then decides whether the area code is required for completing the interconnect call. If required, the controller then prefaces the accumulated PSTN telephone number with the area code preselected by the user of that subscriber unit.

BRIEF DESCRIPTION OF THE DRAWINGS

FIG. 1 is a general diagram depicting the main components of a stand-alone trunked communication system, according to the invention.

FIG. 2 is a flow chart showing the relationship of events in one embodiment of the invention.

FIG. 3 is table showing some of the contents of a record contained in a database, according to the invention.

FIG. 4 is a general diagram depicting the main components of a wide area trunked communication system, according to the invention.

FIG. 5 is a flow chart showing the relationship of events in one embodiment of the invention.

FIG. 6A and 6B are tables showing some of the contents of two records contained in a database, according to the invention.

DETAILED DESCRIPTION OF A PREFERRED EMBODIMENT

FIG. 1 shows a typical stand-alone trunked dispatch communication system 100. The system consists of a fixed site 102, a dedicated set of public switched telephone network (PSTN) lines 104, a controller 106, at least two repeaters 108 and 109, and one or more subscriber units 110 and 111. Typically one of the repeaters 108 and its associated radio frequencies make up a duplex control channel under which all communication activity is directed. Additional repeaters are utilized for establishing voice channels used to carry out the actual communication data to and from subscriber units within the system.

The controller 106 has access to a database having one or more data records which uniquely define the communication capabilities of each subscriber unit on the trunked communication system. FIG. 3 gives a detailed look at a portion of one such data record 300, called a subscriber access code (SAC), which can be partially modified by the subscriber and fully modified by the system administrator at the fixed site. Generally, data records are partitioned into data fields, which fields are accessed via pointers into that record. The field 302 contains a subscriber unit identification code which may be, for example, a sequential integer between one and seven, as shown. The field 304 holds a PSTN calling code, or area code, referred to as a personal area code (PAC), which the user of the associated subscriber unit has preselected. This area code is presumably, but not necessarily, different from the one associated with the PSTN lines at the fixed site. Field 306 holds information which reflects the capability of the associated subscriber unit to make interconnect calls to a land-line telephone system. Without telephone interconnect capability, the storage of a PAC for a given subscriber unit is meaningless, and hence the field 304 is empty, for example as shown with subscriber units '2' and '4'.

FIG. 2 shows a flow chart 200 which describes the sequence of events required in the preferred embodiment of the invention. The process 201 begins when a subscriber unit within the coverage area of the stand-alone trunked communication system initiates a request to make an interconnect telephone call. Upon receipt of the request, the controller 106 determines at 203 the identity of the subscriber unit by means of a standardized identification code associated with that subscriber unit. Then, using the aforementioned identification code of the subscriber unit as a pointer into the record 300, the controller 106 reads at 207 the interconnect capability field 306 of that record. At this point, a decision is made at 209 as to whether or not the initiated call request will be granted. This decision depends upon the telephone interconnect capabilities of the subscriber unit initiating the call. If no such capability exists, the routine is exited at 221. If the capability does exist, the controller 106 determines at 211 whether or not the user of the subscriber unit has requested that a PAC be prefaced to the PSTN telephone number that he has keyed from his subscriber unit. If no such request was made, the controller 106 simply issues at 219 the PSTN telephone number exactly as it was keyed by the user of the subscriber unit, and exits the routine at 221. If the subscriber unit has made such a request, the controller 106 reads at 213 the PAC field 304 in the SAC record 300. At this point, the controller compares at 215 the fixed area code (FAC) associated with the PSTN phone lines at the fixed site to the PAC associated with the subscriber unit to check for equality. If the FAC is the same as the PAC, then the controller 106 issues at 219 the PSTN telephone number as keyed by the user of the subscriber unit and then exits the routine at 221. If the PAC and the FAC are not the same, the controller 106 issues at 217 the PAC, issues at 219 the PSTN telephone number as keyed by the subscriber unit, and then exits the routine at 221. Note that, in the preferred embodiment of the invention, the user of the subscriber unit need not know whether or not the area code of the land-line telephone that he wishes to contact is required to successfully complete the interconnect call.

FIG. 4 shows a block diagram of a wide area trunked dispatch communication system 400. A controller 401 is connected, for example via wire-line, to a plurality of fixed sites 402, 403, 404 which sites each have a plurality of repeaters 405. Each of the fixed sites 402, 403, 404 is associated with a PSTN area code, which is determined by the geographic location of each site. As in the case of the stand-alone system, the wide area system includes a plurality of subscriber units 406, 407, 408 roaming within the coverage boundaries of the system.

FIG. 6A shows a portion of an adapted version of a subscriber access code (SAC) record 600. Similar to the SAC record 300 described in FIG. 3, the record 600 contains the information used by the controller 401 for determining the access capabilities of each of the subscriber units 406, 407, 408 within the wide area system 400. As in the stand-alone system, the record 600 can be modified, at least partially, at either the subscriber end or at the fixed end. Referring to the contents of record 600, the field 601 holds subscriber identification codes for all the subscriber units 406, 407, 408 which are supported on the system. The field 603, much like the field 306, contains a code which determines the telephone interconnect capability of the associated subscriber unit. The field 605, like the field 304, contains a PSTN calling code selected by each of the subscriber units 406, 407, 408 and represents the area code of a geographic area that is of interest to that subscriber unit, and similarly called a PAC. The field 607, much like the field 605, contains a home site area code (HAC) which represents the area code of a subscriber unit's primary fixed site, for example 403, to which the majority of that subscriber unit's communications are directed.

FIG. 6B shows a portion of a data record 602, which represents a fixed site access table (FSAT). Within this record, the field 604 represents identification codes which are associated with each of the fixed sites 402, 403, 404 within the coverage area of the trunked communication system 400. The field 606 contains information representing the associated fixed PSTN area code (FAC) of the geographic location in which the associated fixed site, for example 403, is located.

FIG. 5 shows a flow chart 500 which describes the relationship of events in the preferred embodiment of the invention as employed in a wide area communication system 400. Upon call initiation at 502 in which a subscriber unit, for example 407, initiates a call through a particular fixed site, for example 403, the controller 401 determines at 504 the identification code of the active fixed site through which the call is initiated. Using this identification code as a pointer into the FSAT record 602, the controller 401 then looks up at 506 the associated FAC of that fixed site from the field 606. Next, the controller 401 determines at 508 the identification code of the initiating subscriber unit, then uses this indentification code as a pointer into the SAC record 600, to look up at 510 the interconnect capabilities of that subscriber unit from the field 603. If the subscriber unit is found at 512 to have no such interconnect capability, the routine is exited at 524. If interconnec capability is found at 512 to exist for the subscriber unit, then a decision point is reached at 514. If the call initiator has not requested that a HAC or PAC be prefaced to the keyed PSTN telephone number, the keyed PSTN telephone number is issued at 522 exactly as keyed by the subscriber unit and the routine is exited at 524. If a HAC or PAC has been requested, the controller 401 uses the identification code obtained at the outset of the call to look up at 516 the associated HAC or PAC for that subscriber unit. Then the controller compares at 518 the subscriber units HAC or PAC with the FAC associated with the fixed site to see if they are identical. If they are not the same, the controller 401 issues at 520 the requested HAC or PAC, and then issues at 522 the PSTN telephone number exactly as keyed by the subscriber unit, and exits the routine at 524. If, upon comparison of these two area codes, they are found to be identical, the controller 401 simply issues at 522 the accumulated PSTN telephone number exactly as keyed by the subscriber unit, and exits the routine at 524.

What is claimed is:

1. A radio communication controller coupled to the Public Switched Telephone Network (PSTN) and associated with a fixed PSTN area code, the radio communication controller having a stored identification code and a first PSTN area code, each associated with a subscriber unit and an accumulator which accumulates a keyed PSTN telephone number from the at least one subsrciber unit, the radio communication controller further comprising:

means for receiving an identification and a service request from the subscriber unit;
   means for matching said received identification with the stored identification code;
   means for detecting a difference between the first PSTN area code and the fixed PSTN area code when said received identification and the stored identification code are the same; and
   means for prefacing the accumulated PSTN telephone number with the first PSTN area code when said detected difference is present.

2. A radio communication controller in accordance with claim 1, wherein said means for matching further comprises means for retrieving the stored first PSTN area code.

3. A radio communication controller in accordance with claim 1, further comprising means for sending the accumulated PSTN telephone number when said detected difference is absent, and means for sending said prefaced PSTN telephone number when said detected difference is present, out to the PSTN telephone lines.

4. A radio communication controller in accordance with claim 1, wherein said means for storing further comprises means for storing at least one data record.

5. A radio communication controller in accordance with claim 4, wherein said at least one data record further comprises a first field allocated for the identification code, and a second field allocated for the first PSTN area code.

6. A radio communication controller coupled to the Public Switched Telephone Network (PSTN), further coupled to at least two fixed sites, the radio communication controller having stores first identification code and first PSTN area code, each associated with a subscriber unit, a stored second identification code and fixed PSTN area code, the second identification code and the fixed PSTN area code associated with one of the at least two fixed sites, an accumulator which accumulates a keyed PSTN telephone number from the at least one subscriber unit, the radio communication controller further comprising:

first means for receiving a first identification and a service request from the subscriber unit, which request indicates that a PSTN area code is to be retrieved;
   first means for matching said received first identification with the first identification code;
   second means for receiving a second identification of one of the at least two fixed sites, which fixed site is communicating with the subscriber unit;
   second means for matching said received second identification with the second identification code;
   means for detecting a difference between said requested PSTN area code and the fixed PSTN area code; and
   means for prefacing the accumulated PSTN telephone number with said requested PSTN area code when said detected difference is present.

7. A radio communication controller in accordance with claim 6, further comprising a first data record, said first data record comprising a first field allocated for said first identification code, and a second field allocated for said first PSTN area code.

8. A radio communication controller in accordance with claim 6, further having a stored second PSTN area code associated with the at least one subscriber unit, and a means for receiving a second service request, which request indicates that the second PSTN area code is to be retrieved.

9. A radio communication controller in accordance with claim 6, further comprising means for sending the accumulated PSTN telephone number when said detected difference is absent, and means for sending said prefaced PSTN telephone number when said detected difference is present, out to the PSTN telephone lines.

10. A radio communication controller in accordance with claim 6, wherein the stored second identification code is associated with a second data record, said second data record comprising a third field allocated for said second identification code, and a fourth field allocated for said fixed PSTN area code.

11. A radio communication system having at least two fixed sites coupled to the Public Switched Telephone Network (PSTN), a controller coupled to each of the at least two fixed sites and also coupled to the PSTN, and at least one subscriber unit, the radio communication system controller further having a stored first identification code and first PSTN area code associated with each of the at least one subscriber unit, a stored second identification code and fixed PSTN area code associated with each of the at least two fixed sites, a stored second PSTN area code associated with each of the at least one subscriber unit, the radio communication system controller further having an accumulator which accumulates a key PSTN telephone number from the at least one subscriber unit, the radio communication system comprising:

first means for receiving a first identification and a service request from the at least one subscriber unit, which request indicates whether the first or the second PSTN area code is to be retrieved;
   second means for receiving a second identification of one at least two fixed sites, which fixed site is communicating with the subscriber unit;
   first means at the controller for matching said first identification with the first identification code;
   second means at the controller for matching said second identification with the second identification code;
   means at the controller for detecting a difference between said requested PSTN area code and the fixed PSTN area code; and
   means at the controller for prefacing the accumulated PSTN telephone number with said requested PSTN area code when said detected difference is present.

12. A radio communication system in accordance with claim 11, further comprising means at the controller for sending the accumulated PSTN telephone number when said detected difference is absent, and means for sending said prefaced PSTN telephone number when said detected difference is present, out to the PSTN telephone lines.

13. A method of prefacing a first Public Telephone Switching Network (PSTN) area code which, along with an identification code, is stored in a database in a radio communication controller, which first PSTN area code and identification code is associated with a subscriber unit, to a PSTN telephone number keyed by a user of the subsrciber unit and accumulated by the radio communication controller, the radio communication controller being located at a site which is associated with a fixed PSTN area code, comprising the steps of:
 receiving an identification and a service request from the at least one subscriber unit;
 matching said received identification with the stored identification code;
 detecting a difference between the first PSTN area code and the fixed PSTN area code when said matching step yields an exact likeness between said received identification and the stored identification code; and
 prefacing the accumulated PSTN telephone number with the first PSTN area code when said detecting a difference step yields a difference between the first PSTN area code and the fixed PSTN area code.

14. A method of prefacing in accordance with claim 13, further comprising the step of sending the accumulated PSTN telephone number when said detecting step yields no difference, and means for sending said prefaced PSTN telephone number when said detecting step yields a difference, out to the PSTN telephone lines.

15. A method of prefacing a predetermined, requested Public Telephone Switching Network (PSTN) area code which, along with a first identification code, is stored in a database within a radio communication controller, and associated with one of at least one subscriber unit, to a PSTN telephone number keyed by a user of the at least one subscriber unit and accumulated by the controller, the radio communication controller being coupled to at least two fixed sites, each fixed site associated with a fixed PSTN area code, the database further storing a second identification code and the fixed PSTN area code, each associated with one of the at least two fixed sites, comprising the steps of:
 receiving a first identification and service request from one of the subscriber unit, which request indicates that a PSTN area code is to be retrieved;
 matching said received first identification with the first identification code;
 receiving a second identification of one of the at least two fixed sites, which fixed site is communicating with said one subscriber unit;
 matching said raceived second identification with the second identification code;
 detecting a difference between said requested PSTN area code and the fixed PSTN area code; and
 prefacing the accumulated PSTN telephone number with said requested PSTN area code when said detecting step yields a difference.

16. A method of prefacing in accordance with claim 15, further comprising the step of sending the accumulated PSTN telephone number when said detecting step yield no difference, and means for sending said preface PSTN telephone number when said detecting step yields a difference, out to the PSTN telephone lines.

17. A method of prefacing a first or a second Public Telephone Switching Network (PSTN) area code which, along with a first identification code, are stored in a database and associated with one of at least one subscriber unit, to a PSTN telephone number keyed by a user of the at least one subscriber unit roaming within a radio communication system, which radio communication system further comprises a controller which accumulates the keyed PSTN telephone number and is coupled to the database and at least two fixed sites, each fixed site associated with a fixed PSTN area code, the database further storing a second identification code and the fixed PSTN area code, each associated with one of the at least two fixed sites, comprising the steps of:
 receiving a first identification and service request from one of the at least one subscriber unit, which request indicates whether the first or the second PSTN area code is to be retrieved;
 receiving a second identification of one of the at least two fixed sites, which fixed site is communicating with said one subscriber unit;
 matching the first identification with the first identification code;
 matching the second identification with the second identification code;
 detecting a difference between said fixed PSTN area code and said requested PSTN area code when said first identification and the first identification code are equal; and
 prefacing the accumulated PSTN telephone number with said requested PSTIN area code when said detecting step yields a difference.

* * * * *

UNITED STATES PATENT AND TRADEMARK OFFICE
CERTIFICATE OF CORRECTION

PATENT NO.   :   5,153,904

DATED        :   10/6/1992

INVENTOR(S)  :   John J. Coombes, Daniel J. McDonald

It is certified that error appears in the above-identified patent and that said Letters Patent is hereby corrected as shown below:

In claim 6, line 4, please delete the word "stores" and replace with the phrase -- a stored --.

In claim 17, line 16, please delete the word "unit" and replace with the word -- units --.

In claim 17, line 31, please delete the letters "PSTIN" and replace with the letters -- PSTN --.

Signed and Sealed this

Twenty-first Day of September, 1993

Attest:

BRUCE LEHMAN

*Attesting Officer*          *Commissioner of Patents and Trademarks*